(12) United States Patent
Alenius et al.

(10) Patent No.: US 12,508,176 B2
(45) Date of Patent: Dec. 30, 2025

(54) SANITARY ARTICLE COMPRISING A WATER-SOLUBLE DRY COATING COMPRISING SKIN BENEFICIAL ADDITIVES

(71) Applicant: Essity Hygiene and Health Aktiebolag, Gothenburg (SE)

(72) Inventors: Karin Alenius, Gothenburg (SE); Daniel Hagberg, Kullavik (SE); Katarina Zorevand, Gothenburg (SE); Frida Ryttsén, Gothenburg (SE)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 0 days.

(21) Appl. No.: 18/835,828

(22) PCT Filed: Mar. 7, 2022

(86) PCT No.: PCT/EP2022/055679
§ 371 (c)(1),
(2) Date: Aug. 5, 2024

(87) PCT Pub. No.: WO2023/169647
PCT Pub. Date: Sep. 14, 2023

(65) Prior Publication Data
US 2025/0134734 A1   May 1, 2025

(51) Int. Cl.
*A61F 13/15*   (2006.01)
*A61F 13/511*   (2006.01)
(Continued)

(52) U.S. Cl.
CPC .... *A61F 13/51113* (2013.01); *A61F 13/8405* (2013.01); *A61L 15/44* (2013.01);
(Continued)

(58) Field of Classification Search
CPC ............ A61F 13/51113; A61F 13/8405; A61F 2013/51059; A61F 2013/5109;
(Continued)

(56) References Cited

U.S. PATENT DOCUMENTS

| 2003/0130636 A1 | 7/2003 | Brock et al. |
| 2007/0088304 A1 | 4/2007 | Sakano et al. |

(Continued)

FOREIGN PATENT DOCUMENTS

| CN | 112218604 A | 1/2021 |
| CN | 112236115 A | 1/2021 |

(Continued)

OTHER PUBLICATIONS

International Preliminary Report on Patentability and Written Opinion of the International Searching Authority (Forms PCT/IB/373 and PCT/ISA/237) issued on Sep. 10, 2024, by the International Bureau of WIPO, in corresponding International Application No. PCT/EP2022/055679. (7 pages).
(Continued)

*Primary Examiner* — Jacqueline F Stephens
(74) *Attorney, Agent, or Firm* — BUCHANAN INGERSOLL & ROONEY PC (57) ABSTRACT

A sanitary article, such as a sanitary pad, a pantyliner, a pant diaper or an open diaper, according to the present disclosure includes a fluid permeable topsheet and a backsheet. The sanitary article extends in a longitudinal direction and a transverse direction and has first and second longitudinal side edges and a front and a rear edge. The topsheet is provided with a dry coating in a coated zone on a first side thereof, the first side of the topsheet being the wearer facing side of the topsheet, the dry coating is a water-soluble dry coating comprising allantoin and betaine.

13 Claims, 4 Drawing Sheets

(51) Int. Cl.
*A61F 13/84* (2006.01)
*A61L 15/44* (2006.01)

(52) U.S. Cl.
CPC ... *A61L 2300/204* (2013.01); *A61L 2300/216* (2013.01); *A61L 2300/40* (2013.01); *A61L 2300/606* (2013.01); *A61L 2300/802* (2013.01)

(58) Field of Classification Search
CPC .......... A61F 2013/51117; A61F 115/44; A61L 2300/204; A61L 2300/216; A61L 2300/40; A61L 2300/606; A61L 2300/802
USPC ................................................. 604/359, 364
See application file for complete search history.

(56) References Cited

U.S. PATENT DOCUMENTS

| | | | |
|---|---|---|---|
| 2008/0300563 A1* | 12/2008 | Berland | A61F 13/8405 604/385.27 |
| 2014/0257216 A1 | 9/2014 | Gatto et al. | |
| 2019/0254889 A1* | 8/2019 | Stridfeldt | A61L 15/62 |
| 2021/0169711 A1 | 6/2021 | Palmqvist et al. | |
| 2021/0212867 A1 | 7/2021 | Palmqvist et al. | |

FOREIGN PATENT DOCUMENTS

| | | | | |
|---|---|---|---|---|
| CN | 112261928 A | 1/2021 | | |
| CN | 112656717 A | 4/2021 | | |
| JP | 2003524470 A | 8/2003 | | |
| JP | 2007130435 A | 5/2007 | | |
| JP | 2021527494 A | 10/2021 | | |
| WO | WO-9616682 A1 * | 6/1996 | ........ | A61F 13/51113 |
| WO | 0069483 A1 | 11/2000 | | |
| WO | 0069485 A1 | 11/2000 | | |
| WO | 2019240644 A1 | 12/2019 | | |

OTHER PUBLICATIONS

Notification of the First Office Action issued on Sep. 27, 2024, by the Chinese Patent Office in corresponding Chinese Patent Application No. 202280089913.8, and an English Translation of the Office Action. (18 pages).

Office Action (Decision of Rejection) issued on Dec. 23, 2024, by the Chinese Patent Office in corresponding Chinese Patent Application No. 202280089913.8, and an English Translation of the Office Action. (14 pages).

International Search Report (PCT/ISA/210) and Written Opinion (PCT/ISA/237) mailed on Oct. 17, 2022, by the European Patent Office as the International Searching Authority for International Application No. PCT/EP2022/055679, 12 pages.

Office Action (Notice of Reasons for Rejection) issued on Jul. 15, 2025, by the Japanese Patent Office in corresponding Japanese Patent Application No. 2024-553467, and an English Translation of the Office Action. (17 pages).

* cited by examiner

SANITARY ARTICLE COMPRISING A WATER-SOLUBLE DRY COATING COMPRISING SKIN BENEFICIAL ADDITIVES

TECHNICAL FIELD

The disclosure pertains to a sanitary article, such as a sanitary pad, a panty liner, a diaper or an incontinence pad, comprising a topsheet and a backsheet, the topsheet comprising a water-soluble dry coating comprising skin beneficial additives.

BACKGROUND

Sanitary articles of the kind to which this disclosure pertains are worn against the skin and comprise a topsheet and a backsheet layer. All uses of products which are applied in direct contact with the skin may lead to unwanted side-effects. These may occur as a result of occlusion, moisture, mechanical, microbial, and enzymatic factors which all, to different degrees, interact and amplify the influence of each other and may cause different forms of skin irritation for users of said articles.

During frequent insults of bodily fluids and frequent use of disposable sanitary articles, the skin can become irritated, appear red, and be sore to the touch. Shaved skin in the genital area and the use of tight clothing are also potential causes to rashes and skin irritations. Creams, ointments or formulations can be used to provide an artificial hydrophobic barrier on the skin and to prevent or calm skin irritations. However, the use of such hydrophobic compositions in disposable sanitary articles has a negative impact on the absorbency performance of the articles. To avoid this side effect, hydrophobic compositions are often applied in relatively low amounts and in different patterns on the topsheet, such as in elongated stripes extending in parallel over the topsheet. Separate application of creams, formulations and ointments to the skin is often messy and inconvenient. Often, these products are not used prophylactically and are only used when signs of skin irritation, such as diaper rash, are visible.

In view of the above, there is still a need for sanitary articles with a skin beneficial effect, which provide an improved skin barrier, prevents skin irritations while retaining adequate properties with regard to absorbency performance.

SUMMARY OF THE INVENTION

One or more of the above objects may be achieved with a sanitary article in accordance with claim 1. Further embodiments are set out in the dependent claims, in the following description and in the drawings.

A sanitary article, such as a sanitary pad, a pantyliner, a pant diaper or an open diaper, according to the present disclosure comprises a fluid permeable topsheet and a backsheet. The sanitary article extends in a longitudinal direction and a transverse direction and has first and second longitudinal side edges and a front and a rear edge. The topsheet is provided with a water-soluble dry coating in a coated zone on a first side thereof. The first side of the topsheet is the wearer facing side of the topsheet and the dry coating is a water-soluble dry coating comprising allantoin and betaine.

The term "sanitary article" refers to a product that is placed against the skin of the wearer in the wearer's crotch to absorb and contain body exudates, like discharges, urine, faeces and menstrual fluid. The disclosure mainly refers to disposable sanitary articles, which means articles that are not intended to be laundered or otherwise restored or reused as a sanitary article. Examples of disposable sanitary articles include feminine hygiene products such as sanitary napkins, panty liners, incontinence pads, diapers, and the like.

During use, sanitary articles remain in close contact with the skin of the user. A moist environment between the topsheet and the skin, resulting from frequent insults during use of the sanitary articles, may increase the friction and lead to skin irritations and a deteriorated skin barrier.

To prevent skin irritations and a deteriorated skin barrier, the topsheet has been provided with allantoin, (CAS [97-59-6]). Allantoin has been found to provide a soothing skin effect and to function as an anti-irritant and calming agent for irritable skin and to support the skin in becoming more resilient. Allantoin interacts with the skin's keratin to thin out an abnormally thick epidermis. By providing a constantly shedding epidermis layer, more cells are produces, keeping the skin healthy and plump. By stimulating rapid cell regeneration, healthy tissue growth is stimulated. This has been found important for healing wounds and may clear away dead skin cells, making healthy new tissue. Allantoin also helps in the synthesis of collagen, thereby helping the skin to remain elastic.

To further enhance the skin barrier, the dry coating combines allantoin with betaine, which has been found to enhance the overall skin barrier function even in healthy skin. Betaine upregulates tight junction proteins in the outermost part of the skin. These proteins act like bridges between the cells and seals the passage between the cells, thereby only permitting selective permeability. The betaine may be trimethylglycine, CAS [107-43-7]. Trimethylglycine is an amino acid derivative and is a natural occurring amino acid derivate active in cell metabolism in many organisms including humans.

Betaine furthermore has humectant properties. By attracting water, it helps the skin to keep moisturized. Betaine is also an osmolyte, which helps living cells to keep their shape and manage the water balance under osmotic stress.

The inventors of the present disclosure have found that a water-soluble dry coating according to the present invention provides a surprisingly high transfer from the topsheet of the sanitary article to the skin of the user. The penetration of the allantoin and the betaine may also be detected together with an improved skin status of the user. The fact that the skin benefit agents are provided in a water-soluble dry coating has also been seen to provide a smooth pleasant feeling without the sticky feel of hydrophobic formulations.

The combination of allantoin and betaine has also been seen to provide a combinatory effect of improving the skin barrier properties and thereby prevent and reduce skin irritations of the user of the sanitary article.

The allantoin may be present in the dry coating in an amount within the range of from 0.0002 to 0.36 gsm, as measured over the total coated zone on the article. Optionally, the allantoin may be present in the dry coating in amount within the range of from 0.0005 to 0.21 gsm, or within the range of from 0.002 to 0.08 gsm as measured over the total coated zone on the article. Such amounts of allantoin promote a sufficient and improved transfer to the skin from the topsheet during use of the sanitary article and improved skin benefits.

The betaine may be present in the dry coating on the article in an amount within the range of from 0.001 to 1.2 gsm, as measured over the total coated zone. Optionally, the betaine may be present in the dry coating in amount within the range of from 0.0025 to 0.7 gsm, as measured over the total coated zone. Optionally, the betaine may be present in the dry coating in amount within the range of from 0.01 to 0.5 gsm, as measured over the total coated zone. Such amounts of betaine promote a sufficient transfer to the skin from the topsheet during use of the sanitary article and also penetration into the skin, thereby providing improved skin benefits.

An improved and combined effect has been seen when the allantoin is present in the dry coating in an amount within the range of from 0.0002 to 0.36 gsm, or within the range of from 0.0005 to 0.21 gsm, or within the range of from 0.002 to 0.08, and when the betaine is present in the dry coating in an amount within the range of from 0.001 to 1.2 gsm, or within the range of from 0.0025 to 0.7 gsm, or within the range of from 0.01 to 0.5 gsm, as measured over the total coated topsheet.

The coating is applied to the topsheet as an aqueous formulation with the allantoin and betaine dispersed and/or dissolved in the aqueous formulation. The allantoin may be partly dissolved and partly dispersed in the aqueous formulation, depending on the amount of allantoin added to the formulation.

The water-soluble dry coating may comprise a water miscible vehicle, such as glycerine, propylene glycol and/or PEG. The dry water-soluble coating may be free from oil and from emulsifier, the dry water-soluble coating could alternatively be free from non-encapsulated oil and/or emulsifiers. The glycerine may be used as a base in the dry coating and may be present in an amount of 1.0 to 98.5 weight %.

According to one embodiment, the total area of the topsheet is coated. According to this embodiment, the area of the coated zone is the same as the total area of the topsheet. Alternatively, only a part of the total area of the topsheet is coated.

The topsheet may have a central coating free zone arranged along a longitudinal centreline of the sanitary article. The coated zone may be arranged to provide an outer border delimiting an inner central zone, consisting or comprising of the central coating free zone.

The sanitary article may be an open diaper, a belt diaper or a pant diaper and the dry coating covers at least 2%, or at least 5% of a total surface area of the topsheet. Diapers have a greater surface area than sanitary pads and thus covers a greater area of the user skin and the coated zone may be arranged in some parts only, such as in the rear part, the groin area of the diaper or in the belly area.

An absorbent core may be arranged between the topsheet and the backsheet. The absorbent core may constitute of one or several absorbent layers, such as two or three absorbent layers. The absorbent core may include an acquisition and distribution layer (ADL), which may be arranged between the topsheet and the absorbent core.

The absorbent core may comprise pulp fibers and/or superabsorbent polymer particles.

The dry coating may be applied within the dry coated zone in an amount with the range of from 0.2 to 12 gsm, optionally in an amount within the range of from 0.5 to 7 gsm, or in an amount within the range of from 0.5 to 3.0 gsm.

The aqueous formulation may be added to the topsheet prior to assembly of the sanitary article or to the topsheet of the assembled sanitary article, prior to or after cutting out the individual sanitary article. After drying of the topsheet, the dry coating is formed. The amount of the dry coating is measured after drying the topsheet, so the amount of coating defined in this application is the amount of coating on the article during use of the article.

The topsheet may comprise a second side being an opposite side to the first side, the second side of the topsheet being printed in a printed zone and the coated zone on the first side of the topsheet may partly or completely overlap with the printed zone, as seen in a depth direction perpendicular to the longitudinal direction. This may provide a visual cue to the user of where the dry coating is located which may provide the user with indication of how to place the article, but also provide the user with signal of the presence of the skin beneficial dry coating.

The sanitary article may be made up of a front third, a rear third and a central third arranged between the front and the rear third as seen in the longitudinal direction. The coated zone may be arranged to provide an outer border in the rear third of the sanitary article. delimiting an inner rear zone. The coated zone may cover at least 25%, or at least 35% or at least 50%, of a total surface area of the topsheet in the rear third of the sanitary article. Optionally the coated zone covers within the range of from 25% to 80%, such as within the range of from 35 to 75% of the total surface area of the topsheet in the rear third of the sanitary article.

Alternatively or additionally, the coated zone may be arranged to provide an outer border in the front third of the sanitary article. delimiting an inner front zone. The coated zone may cover at least 25%, or at least 35% or at least 50%, of a total surface area of the topsheet in the front third of the sanitary article. Optionally the coated zone covers within the range of from 25% to 80%, such as within the range of from 35 to 75% of the total surface area of the topsheet in the front third of the sanitary article.

Alternatively or additionally, the coated zone may be arranged to provide an outer border in the central third of the sanitary article delimiting an inner central coated free zone. The coated zone may cover at least 25%, or at least 35% or at least 50%, of a total surface area of the topsheet in the central third of the sanitary article. Optionally the coated zone covers within the range of from 25% to 80%, such as within the range of from 35 to 75% of the total surface area of the topsheet in the central third of the sanitary article.

The formulation may be applied by any suitable method or combination of method, such as for example coating, slot coating, spraying, kiss rolling, dipping or printing.

BRIEF DESCRIPTION OF THE DRAWINGS

The present invention will be further explained hereinafter by means of non-limiting examples and with reference to the appended drawings wherein.

DETAILED DESCRIPTION

It is to be understood that the drawings are schematic and that individual components, such as layers of material are not necessarily drawn to scale. The sanitary article shown in the figures are provided as an example only and should not be considered limiting to the invention as disclosed herein.

The sanitary article may be any one of feminine hygiene products such as sanitary napkins, panty liners, and also incontinence pads, diapers, inserts and the like. The diapers can be open diapers and pant diapers. The sanitary article may be an insert for a sanitary napkin incontinence pad or a diaper.

Figure 1:
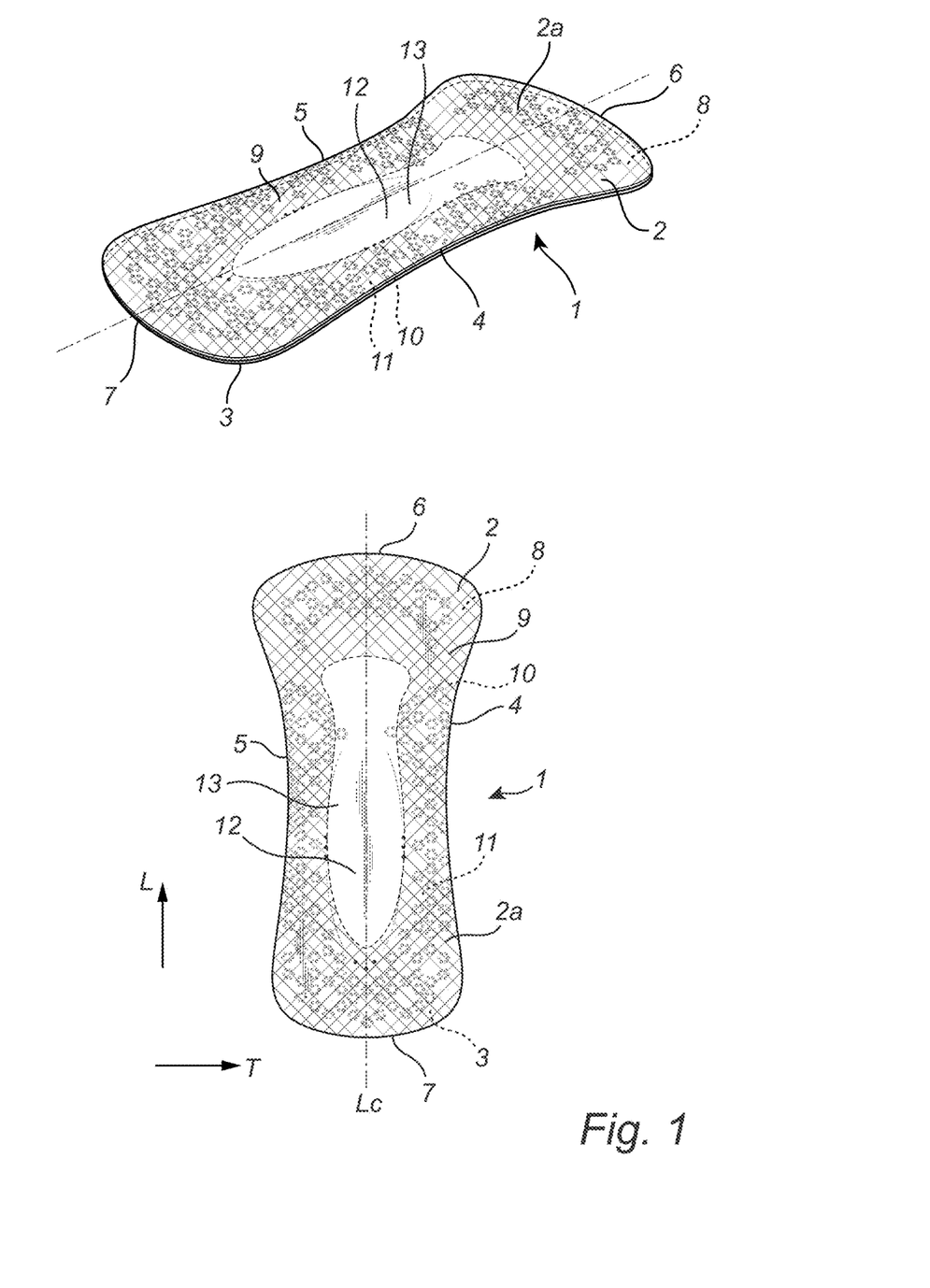
FIG. 1 shows a sanitary pad according to the present disclosure.
Figure 2:
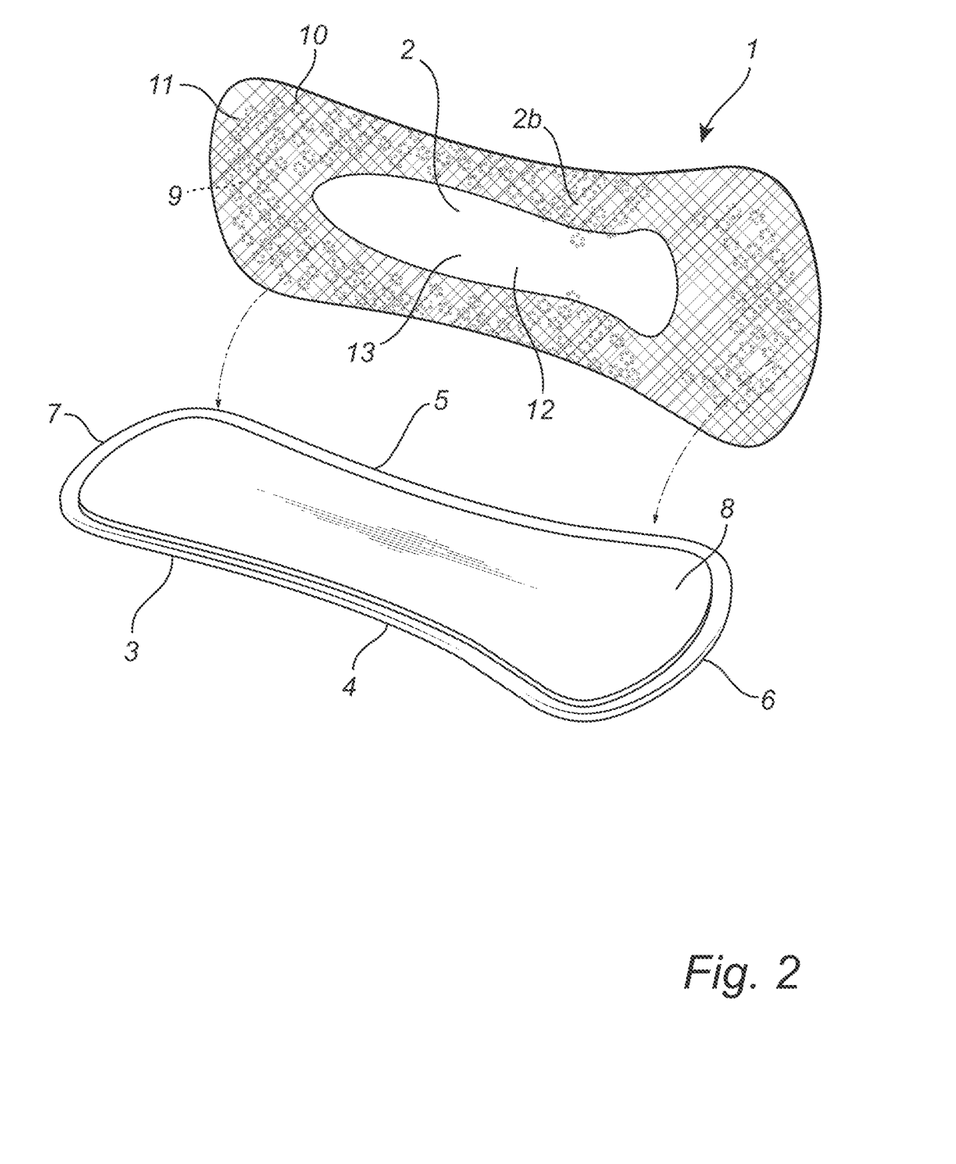
FIG. 2 is an exploded view of the sanitary pad from FIG. 1.

In FIG. 1, the sanitary article 1 is in the form of a sanitary pad and comprises a topsheet 2 and a backsheet 3. The sanitary article 1 extends in a longitudinal direction L and a transverse direction T and has first and second longitudinal side edges 4,5 and a front edge 6 and a rear edge 7. The topsheet 2 comprises a first side 2a, being the user facing side, and a second side 2b, being an opposing side to the user-facing side. The sanitary article 1 comprises an absorbent core 8 arranged between the topsheet 2 and the backsheet 3. The topsheet 2 is provided with a dry coating in a coated zone 9 on the first side 2a of the topsheet 2. The coating is a water-soluble dry coating comprising allantoin and betaine. The absorbent core 8 is an optional feature for the sanitary article 1 of the present disclosure.

The topsheet 2 may include or consist of fibrous nonwoven layer(s) being spunbonded, meltblown, carded, hydroentangled or wetlaid. Suitable nonwoven materials can be composed of natural fibers, such as woodpulp or cotton fibers, synthetic thermoplastic fibers, such as polyolefins, polyesters, polyamides and blends and combinations thereof or from mixtures of natural and synthetic fibers. The materials suited as topsheet material should be soft and non-irritating to the skin and be readily penetrated by body fluid, such as menstrual fluid and urine. The coating is applied to the topsheet as an aqueous formulation with the allantoin and betaine dispersed and/or dissolved in the aqueous formulation. The allantoin may be partly dissolved and partly dispersed in the aqueous formulation, depending on the amount of allantoin added to the formulation. The betaine is dissolved in the aqueous formulation. The formulation may be applied by any suitable method or combination of method, such as for example coating, slot coating, spraying, kiss rolling, dipping or printing. The aqueous formulation may be added to the topsheet prior to assembly of the sanitary article or to the topsheet of the assembled sanitary article, prior to or after cutting out the individual sanitary article. After drying of the topsheet, the dry coating is formed.

One example on a coating composition applied to the topsheet may be demineralized water, glycerine (from 1 wt. % to 98.5 wt. %), betaine (from 1 wt. % to 10 wt. %), allantoin (from 0.5 wt. % to 5 wt. %), optionally Phenoxyethanol, optionally citric acid.

The allantoin may be present in the dry coating in an amount within the range of from 0.0002 to 0.36 gsm, as measured over the total coated zone. Optionally, the allantoin may be present in the dry coating in amount within the range of from 0.0005 to 0.21 gsm, as measured over the total coated zone, or in an amount within the range of from 0.002 to 0.08 gsm. Such amounts of allantoin promotes a sufficient and improved transfer to the skin from the topsheet during use of the sanitary article and improved skin benefits.

The betaine may be present in the dry coating in an amount within the range of from 0.001 to 1.2 gsm, as measured over the total coated zone. Optionally, the betaine may be present in the dry coating in amount within the range of from 0.0025 to 0.7 gsm, as measured over the total coated zone, or in an amount within the range of from 0.01 to 0.5, as measured over the total coated zone. Such amounts of betaine promote a sufficient transfer to the skin from the topsheet during use of the sanitary article and penetration into the skin, thereby providing improved skin benefits.

In this FIG. 1, the topsheet 2 has a central coating free zone 12 arranged along a longitudinal centreline Lc of the sanitary article 1. The central coating free zone 12 may have a length corresponding to from 25% to 80% of the length of the topsheet, as measured at the longitudinal centreline Lc of the sanitary article 1. The coated zone 9 is arranged to provide an outer border delimiting an inner central zone, consisting or comprising of the central coating free zone 12.

The topsheet 2 is furthermore printed with printing elements 10 provided in a printed zone 11. The printing elements 10 are printed on the second side 2b of the topsheet 2, i.e., on the opposite side to the side which the coated zone 9 is provided on. The printed zone 11 overlaps with the coated zone 9 and correlates to the coated zone 9, as seen in a depth direction, perpendicular to the longitudinal direction.

The topsheet 1 furthermore has a central print free zone 13 arranged along the longitudinal centreline Lc of the sanitary article. The central print free zone 13 may have a length corresponding to from 35% to 80 of the length of the topsheet 2, as measured at the longitudinal centreline Lc of the sanitary article 1. The printed zone 11 is arranged to provide an outer border delimiting an inner central zone, consisting or comprising of the central print free zone 13.

The dry coating may comprise a water miscible vehicle, such as glycerine, propylene glycol and/or PEG. The dry coating may be free from oil and from emulsifier, the dry coating could alternatively be free from non-encapsulated oil and/or emulsifiers. The glycerine may be used as a base in the dry coating and may be present in an amount of 1.0 to 98.5 weight %.

The backsheet 3 may consist of a thin plastic film, e.g., a polyethylene or polypropylene film, a nonwoven material coated with a liquid impervious material, a hydrophobic nonwoven, all of which resist liquid penetration. Laminates of plastic films and nonwoven materials may also be used. The backsheet material can be breathable to allow vapor to escape from the absorbent structure, while still preventing liquids from passing through the backsheet material.

An absorbent core 8 constitutes the absorbent structure of the article which acquires and stores bodily fluids. The absorbent core may be of any conventional kind. Examples of commonly occurring absorbent materials are cellulosic fluff pulp, tissue, highly absorbent polymers (so called superabsorbents), absorbent foam materials, absorbent nonwoven materials or the like. It is common to combine cellulosic fluff pulp with superabsorbent polymers in an absorbent core. Superabsorbent polymers are water-swellable, water-insoluble organic or inorganic materials capable of absorbing at least about 20 times their own weight of an aqueous solution containing 0.9 weight percent of sodium chloride. Organic materials suitable for use as a superabsorbent material can include natural materials such as polysaccharides, polypeptides and the like, as well as synthetic materials such as synthetic hydrogel polymers. The size and absorbent capacity of the absorbent core may be varied to suit different product types, such as sanitary napkins for adult incontinent persons or panty liners.

A suitable technique for manufacturing the absorbent cores of the present disclosure is mat-forming through an air-laying process. In the process an air-permeable mould is provided. Fibrous material is air-laid into the mould and the mould is filled, whereby an absorbent core is produced with a desired amount of fibrous material.

The sanitary article may furthermore comprise an acquisition layer arranged between the absorbent core and the topsheet and being bonded to the topsheet at least by means of embossings. It may however additionally be adhesively attached to the topsheet. The liquid acquisition layer is adapted to quickly receive and temporarily store discharged liquid before it is absorbed by the absorbent core. Such acquisition distribution layers may be composed of for example airlaid nonwoven, spunlace nonwoven or high loft nonwoven or foam materials. The nonwoven material may be hydrophilic. A hydrophilic material may be obtained by adding a surfactant.

An air laid nonwoven can be produced with fluff, wood pulp, and here the fluff fibres are dispersed into a fast-moving air stream and condensed onto a moving screen by means of pressure and vacuum. The web can be bonded with resin and/or thermal plastic resin dispersed within the pulp. The web can be thermobonded (by heat), latex bonded (with adhesive) or multibonded (a combination of thermo and latex bonding) or mechanically bonded (high compression and temperature, bonding by hydrogen).

A high loft material is a nonwoven material and may be substantially free from absorbing fibres and superabsorbent material. The high loft nonwoven material may comprise thermoplastic polymer fibres, and may be selected from but not limited to, polyesters, polyamides and polyolefins such as polyethylenes (PE) and polypropylenes (PP), and may be a mixture of any of these. The high loft material refers to low-density bulky fabrics, as compared to flat, paper-like fabrics. High loft webs are characterised by a relatively low density.

Figure 3:
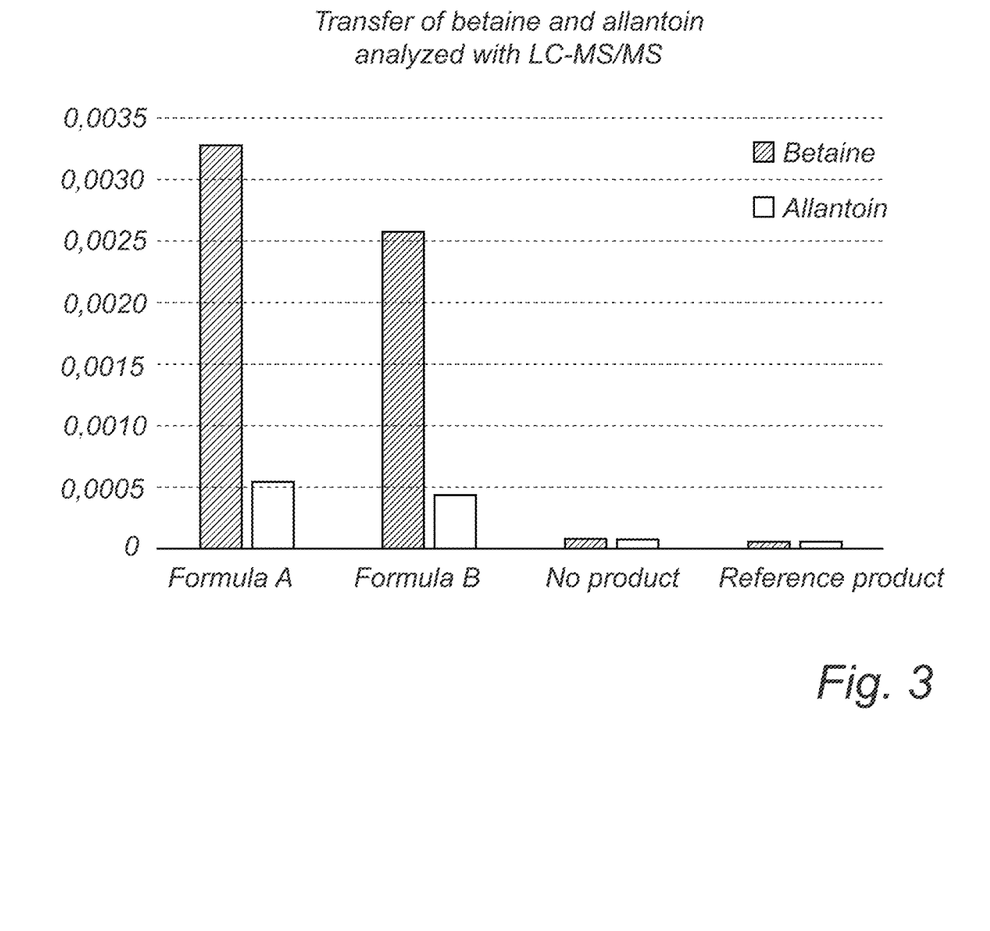
FIG. 3 is a bar chart illustrating results from a transfer study of a dry water-soluble coating according to the present disclosure.

FIG. 3 is a bar chart illustrating the results from a transfer study made with two sanitary articles according to the present invention. Eight test persons wore sanitary articles on three different spots on the volar forearms for three days (3 products per day). One spot was covered with products coated with formula A, one with products coated with formula B and one with reference product without any formula. After three days the skin in the test spots plus one additional spot where no product had been worn was harvested by means of tape stripping. The sample tape strips were extracted, analyzed by LC-MS/MS quantifying the betaine and allantoin content.

As may be seen from FIG. 3, transfer of both betaine and allantoin could be readily detected on the skin, thereby providing the desired effect of the wearer of the sanitary article.

TABLE 1

| English INCI | Formula A % w/w | Formula B % w/w |
|---|---|---|
| Demineralized water | To 100% | To 100% |
| Glycerine | 60% | 9% |
| Betaine | 3.4% | 4.2% |
| Allantoin | 1% | 1% |
| Phenoxyethanol | — | 1% |
| Citric Acid | 0.1% | — |
| Thickening agent | — | 0.7% |

Figure 4:
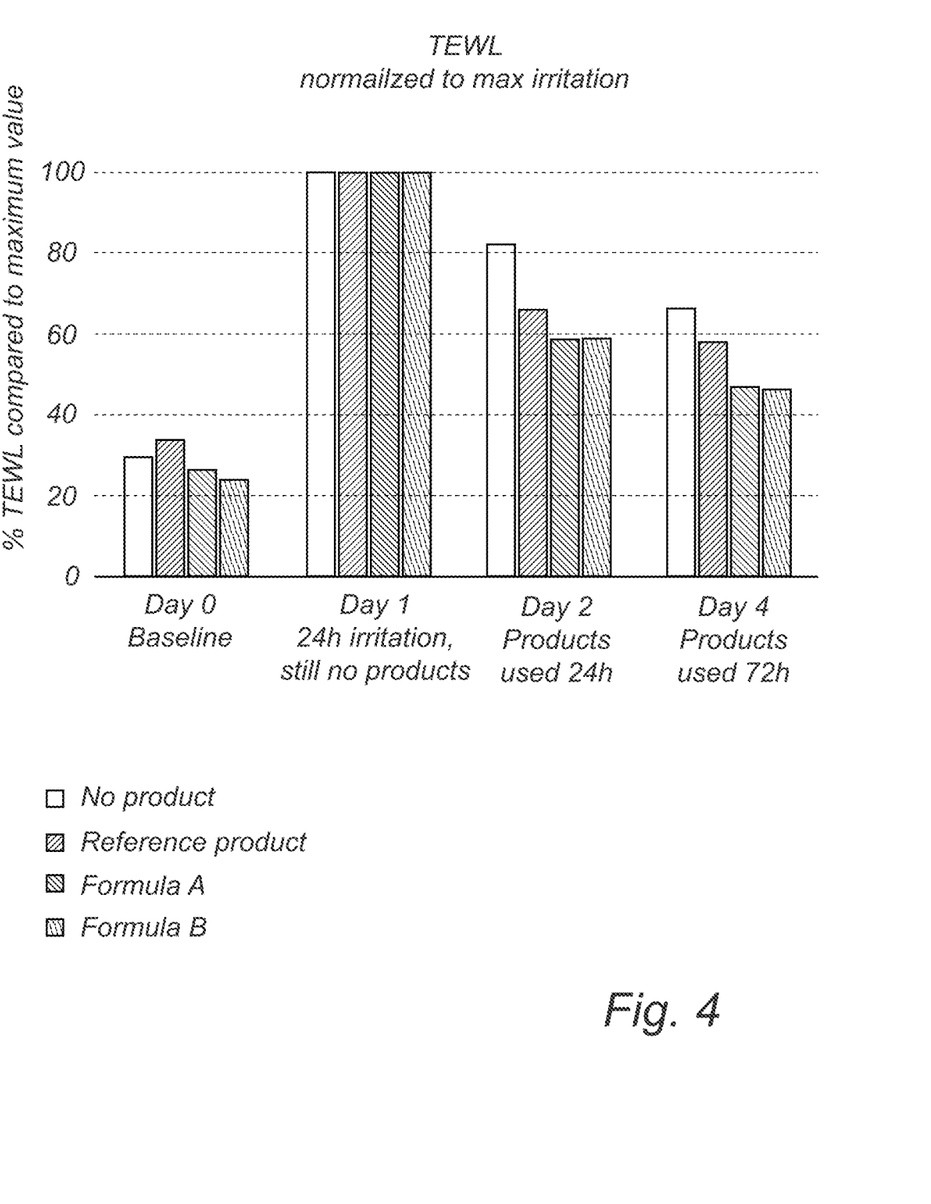
FIG. 4 is a bar chart showing results from a study of the effect provided by a sanitary article according to the present disclosure.

FIG. 4 shows the result from a study of the calming effect of a sanitary article according to the present disclosure. A calming effect was defined as a faster recovery from irritation back to normal skin status and was assessed by the transepidermal water loss (TEWL) as a measure of the skins barrier function by using an AquaFlux Model AF200 instrument (Biox Systems, London, UK). Eight test persons participated in the tests. At day 0, the baseline value of the skin of the volar forearms of each of the test person was measured. An irritating agent, 0.3% sodium lauryl sulfate (SLS), was added to three spots of the arms of the test person and the irritant remained on the arm for 24 h. After 24 h, at Day 1, the irritant was removed, and the skin status was measured. After the measurement one spot was covered with a sanitary article comprising the formula A, one spot was covered with a sanitary article comprising the formula B, one spot was covered with a sanitary article without formula (reference product), and one spot was left uncovered as an untreated reference. Test persons changed sanitary articles themselves so that three products were used per day and spot. Skin status was measured 24 h (Day 2) and 72 h (Day 4) after they started wearing products.

As may be seen from FIG. 4, the sanitary articles provided with formulas A and B according to table 1 showed skin calming effects already after 1 day and still further skin calming effects was shown after 3 days of use of the sanitary articles.

The invention claimed is:

1. A sanitary article comprising a fluid permeable topsheet and a backsheet, the sanitary article extending in a longitudinal direction and a transverse direction and having first and second longitudinal side edges and a front and a rear edge, the topsheet being provided with a dry coating in a coated zone on a first side of the topsheet, the first side of the topsheet being the wearer facing side of the topsheet, wherein the dry coating is a water-soluble dry coating comprising allantoin and betaine, wherein the allantoin is present in the dry coating in amount within the range of from 0.0002 to 0.36 gsm, and wherein the betaine is present in the dry coating in amount within the range of from 0.001 to 1.2 gsm.

2. The sanitary article according to claim 1, wherein the sanitary article is a pantyliner or a sanitary pad and the dry coating covers at least 25% of a total surface area of the topsheet.

3. The sanitary article according to claim 1, wherein the sanitary article is an open diaper, a belt diaper or a pant diaper and the dry coating covers at least 2% of a total surface area of the topsheet.

4. The sanitary article according to claim 1, wherein the dry coating is applied within the dry coated zone in an amount with the range of from 0.2 gsm to 12 gsm.

5. The sanitary article according to claim 1, wherein the topsheet comprises a second side being an opposition side to the first side, the second side of the topsheet being printed in a printed zone and wherein coated zone on the first side of the topsheet partly or completely overlaps with the printed zone, as seen in a depth direction perpendicular to the longitudinal direction.

6. The sanitary article according to claim 1, wherein the dry coating comprises glycerine, propylene glycol and/or PEG.

7. The sanitary article according to claim 6, wherein the absorbent core comprises pulp fibers and/or superabsorbent polymer particles.

8. The sanitary article according to claim 1, wherein the sanitary article comprises an absorbent core.

9. The sanitary article according to claim 1, wherein the coated zone is arranged along the rear edge and the first and the second longitudinal side edges in a rear third of the sanitary article and forming a boundary in the rear third delimiting an inner rear zone comprising or consisting of a coating free topsheet area, the inner rear zone extending along the longitudinal centreline, optionally the coated zone covers at least 25% of the total surface area of the topsheet in the rear third of the article.

10. The sanitary article according to claim 1, wherein the coated zone is arranged along the front edge and the first and the second longitudinal side edges in a front third of the sanitary article, the coated zone delimiting an inner front zone comprising or consisting of a coating free topsheet area, the inner front zone extending along the longitudinal centreline, optionally the coated zone covers at least 25% of the total surface area of the topsheet in the front third of the article.

11. The sanitary article according to claim 1, wherein the coated zone forms a boundary in the central third of the sanitary article delimiting an inner central zone comprising or consisting of a coating free topsheet area, the inner central zone extending along the longitudinal centreline.

12. The sanitary article according to claim 1, wherein the dry coating is free from non-encapsulated oil and/or emulsifier.

13. The sanitary article according to claim 1, wherein the dry coating comprises a water miscible vehicle.

\* \* \* \* \*